US011383667B1

(12) United States Patent
Kadam et al.

(10) Patent No.: US 11,383,667 B1
(45) Date of Patent: Jul. 12, 2022

(54) AIRBAG ASSEMBLY

(71) Applicant: Ford Global Technologies, LLC, Dearborn, MI (US)

(72) Inventors: Mangesh Kadam, Canton, MI (US); Srinivas Reddy Malapati, Novi, MI (US); Yuqin Zhao, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/329,543

(22) Filed: May 25, 2021

(51) Int. Cl.
*B60R 21/207* (2006.01)
*B60R 21/2165* (2011.01)
*B60R 21/2338* (2011.01)

(52) U.S. Cl.
CPC ........ *B60R 21/207* (2013.01); *B60R 21/2165* (2013.01); *B60R 21/2338* (2013.01); *B60R 2021/23386* (2013.01)

(58) Field of Classification Search
CPC .............. B60R 21/207; B60R 21/2165; B60R 21/2338; B60R 2021/23386; B60R 21/23138; B60R 21/21; B60R 21/213; B60R 2021/23192; B60R 2021/23308; B60R 2021/2314; B60R 2021/23388; B60R 2021/2074
See application file for complete search history.

(56) References Cited

U.S. PATENT DOCUMENTS

| | | | |
|---|---|---|---|
| 6,709,010 B2 * | 3/2004 | Dominissini | ....... B60R 22/1953 280/730.2 |
| 7,823,922 B2 * | 11/2010 | Mitchell | ............... B60R 21/232 280/730.2 |
| 9,238,425 B2 * | 1/2016 | Fukawatase | ......... B60N 2/4235 |
| 9,573,553 B2 | 2/2017 | Ko et al. | |
| 9,919,673 B2 * | 3/2018 | Ohno | .................. B60R 21/2338 |
| 9,944,246 B2 | 4/2018 | Ohno et al. | |
| 10,112,570 B2 | 10/2018 | Barbat et al. | |
| 10,471,920 B2 | 11/2019 | Dry et al. | |
| 10,556,563 B2 * | 2/2020 | Song | ..................... B60R 21/2338 |
| 10,625,704 B2 | 4/2020 | Dry et al. | |
| 10,632,958 B2 | 4/2020 | Dry et al. | |
| 10,710,539 B2 | 7/2020 | Cho et al. | |
| 10,850,699 B2 | 12/2020 | Dry et al. | |
| 10,926,733 B2 | 2/2021 | Dry et al. | |
| 11,084,447 B2 * | 8/2021 | Rupp | .................... B60R 21/231 |
| 2013/0015642 A1 | 1/2013 | Islam et al. | |
| 2019/0248322 A1 * | 8/2019 | Herzenstiel | .......... B60R 21/207 |
| 2020/0391690 A1 | 12/2020 | Faruque et al. | |
| 2021/0009067 A1 | 1/2021 | Kadam et al. | |
| 2021/0061211 A1 * | 3/2021 | Jung | ...................... B60R 21/26 |

* cited by examiner

*Primary Examiner* — Paul N Dickson
*Assistant Examiner* — Tiffany L Webb
(74) *Attorney, Agent, or Firm* — Frank A. MacKenzie; Bejin Bieneman PLC

(57) ABSTRACT

An assembly includes a seatback. The assembly includes an airbag supported by the seatback and inflatable to an inflated position seat-forward of the seatback. The airbag includes a first tether fixed to the seatback and the airbag. The airbag includes a retractor. The airbag includes a second tether connected to and slidable along the first tether. The second tether is operatively coupled to the retractor.

20 Claims, 6 Drawing Sheets

AIRBAG ASSEMBLY

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger cabins of vehicles. As an example, vehicles typically include a driver airbag mounted in the steering wheel. Upon inflation, a rim of the steering wheel may act as a reaction surface for the driver airbag. As another example, a side airbag may be mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

An assembly includes a seatback. The assembly includes an airbag supported by the seatback and inflatable to an inflated position seat-forward of the seatback. The airbag includes a first tether fixed to the seatback and the airbag. The airbag includes a retractor. The airbag includes a second tether connected to and slidable along the first tether, the second tether operatively coupled to the retractor.

The seatback may include a head restraint, the airbag supported by the head restraint.

The assembly may include a ring surrounding the first tether and fixed to the second tether.

The first tether may include a restrictor that permits the second tether to slide along the first tether in a first direction and inhibits the second tether from sliding in a second direction opposite the first direction.

The airbag in the inflated position may include an inner panel and an outer panel that define an inflation chamber.

The assembly may include a resilient member fixed to the outer panel, the resilient member stiffer than the outer panel.

The resilient member may be elongated along a vertical axis.

The resilient member may be elongated along a lateral axis.

The assembly may include a gas deflector within the inflation chamber.

The airbag in the inflated position may include a front portion and a pair of side portions, and the gas deflector may include first openings that direct inflation gas to the front portion and second openings that direct inflation gas to the pair of side portions.

The gas deflector may include a first portion that extends seat-forward from the seatback to the first openings and a pair of second portions that extend laterally from the first portion to the second openings.

The assembly may include an internal tether fixed to the inner panel and the outer panel.

The assembly may include a seat bottom supporting the seatback and having a top surface, the airbag in the inflated position extending below the top surface.

The assembly may include a zipper fixed to the airbag.

The zipper may be elongated along a vertical axis and extend to a bottom edge of the airbag in the inflated position.

The retractor may be supported by the seatback below the airbag.

The seatback includes a tear seam that extends downward from the first tether.

The assembly may include a pulley supported by the seatback and operatively coupled to the second tether between the first tether and the retractor.

The second tether may include a releasable buckle.

The assembly may include a third tether fixed to the seatback and the airbag in the inflated position may be above the first tether.

Figure 1:
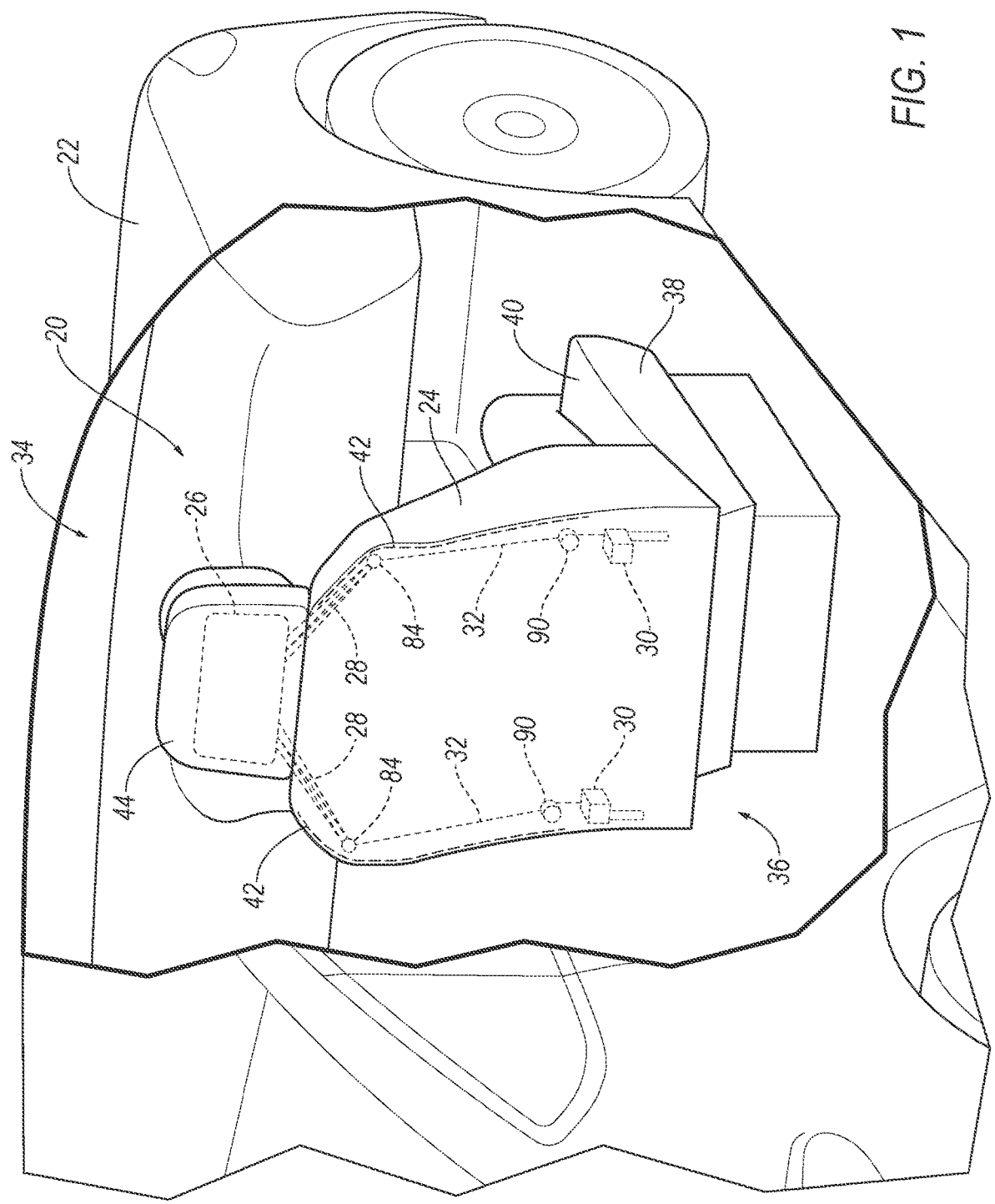
FIG. 1 is a perspective view of a passenger cabin of a vehicle.
Figure 2:
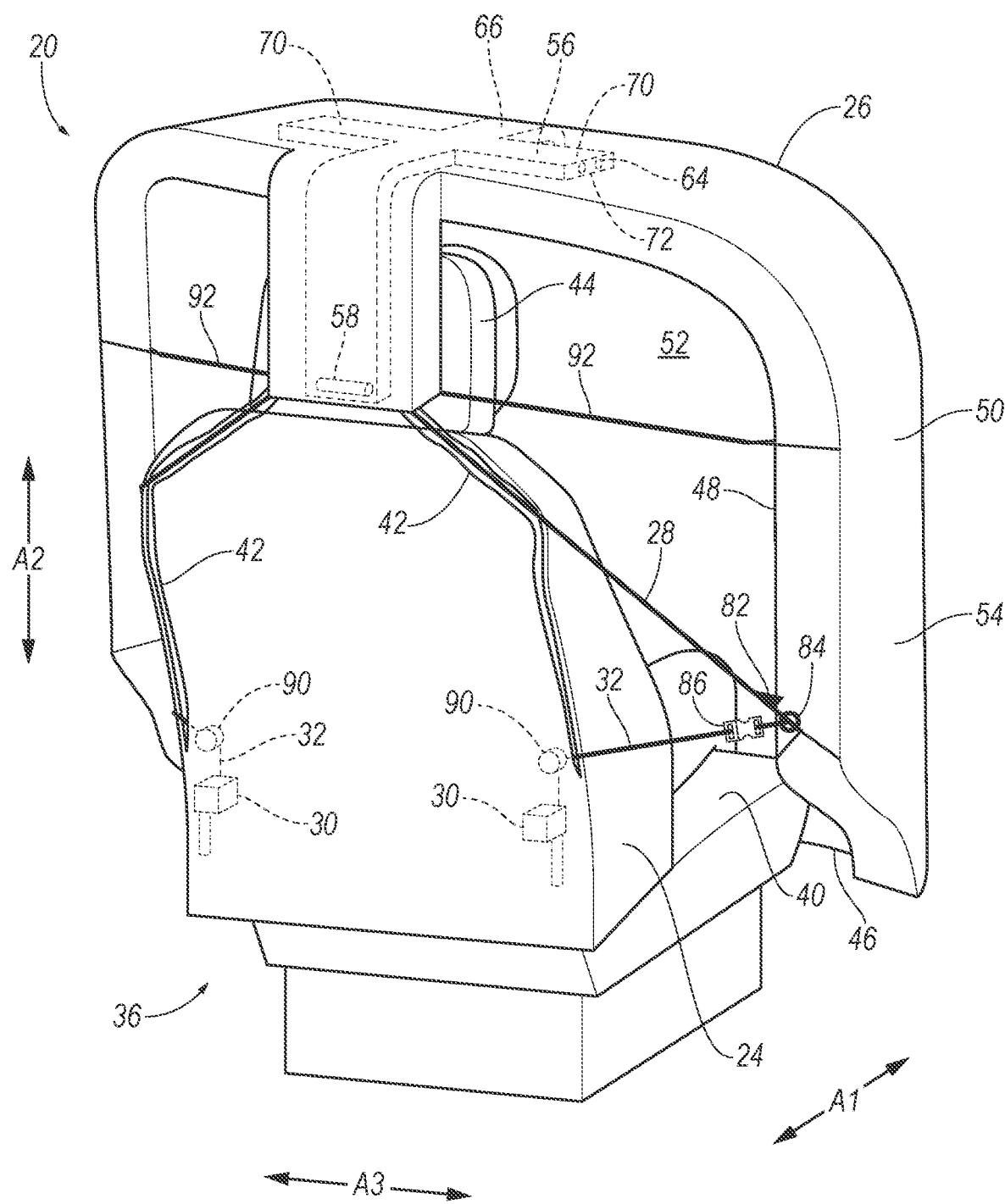
FIG. 2 is a rear perspective view of a seat of the vehicle with an airbag in an inflated position.
Figure 3:
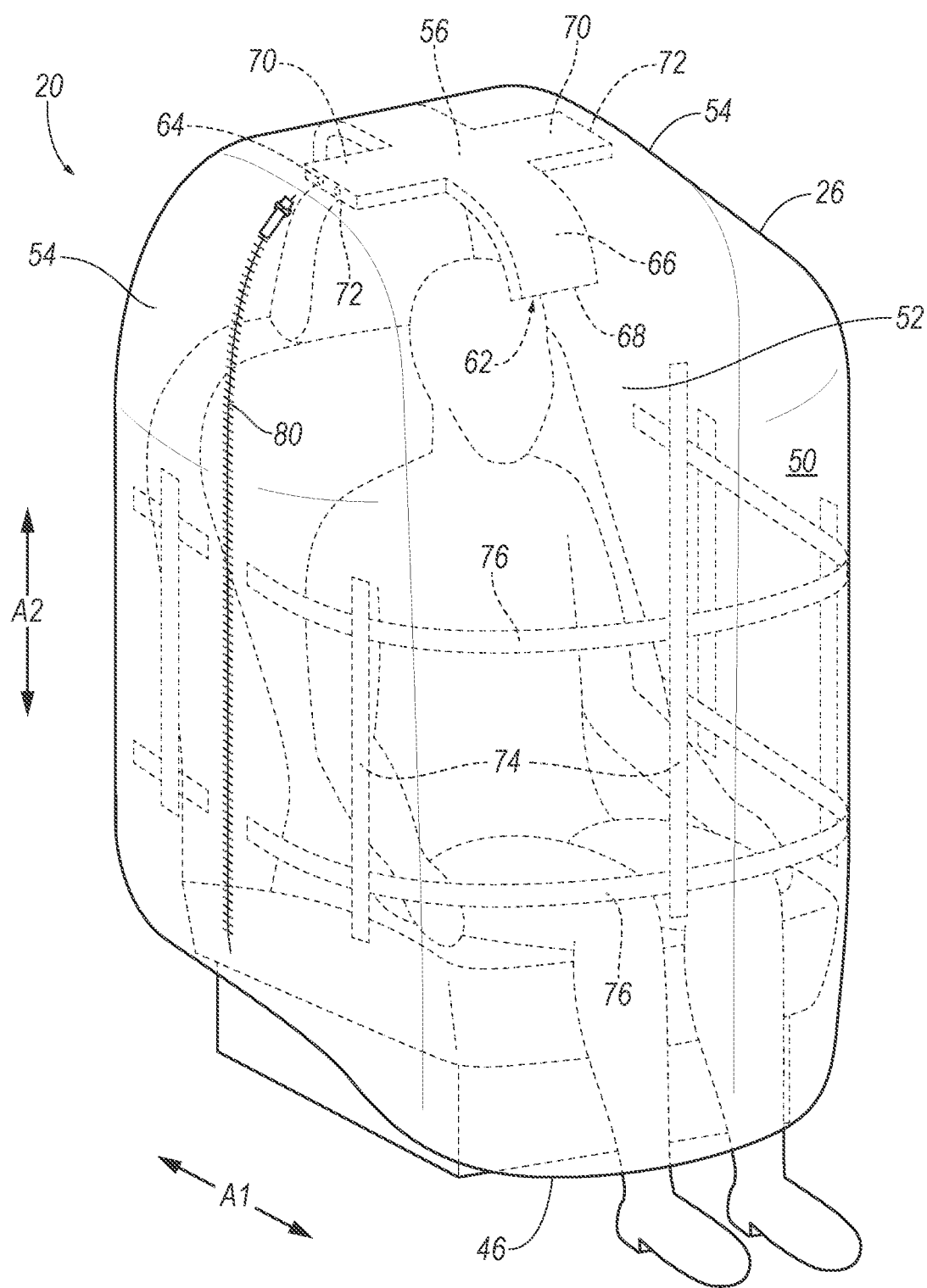
FIG. 3 is a front perspective view of the seat of the vehicle with the airbag in the inflated position.
Figure 4:
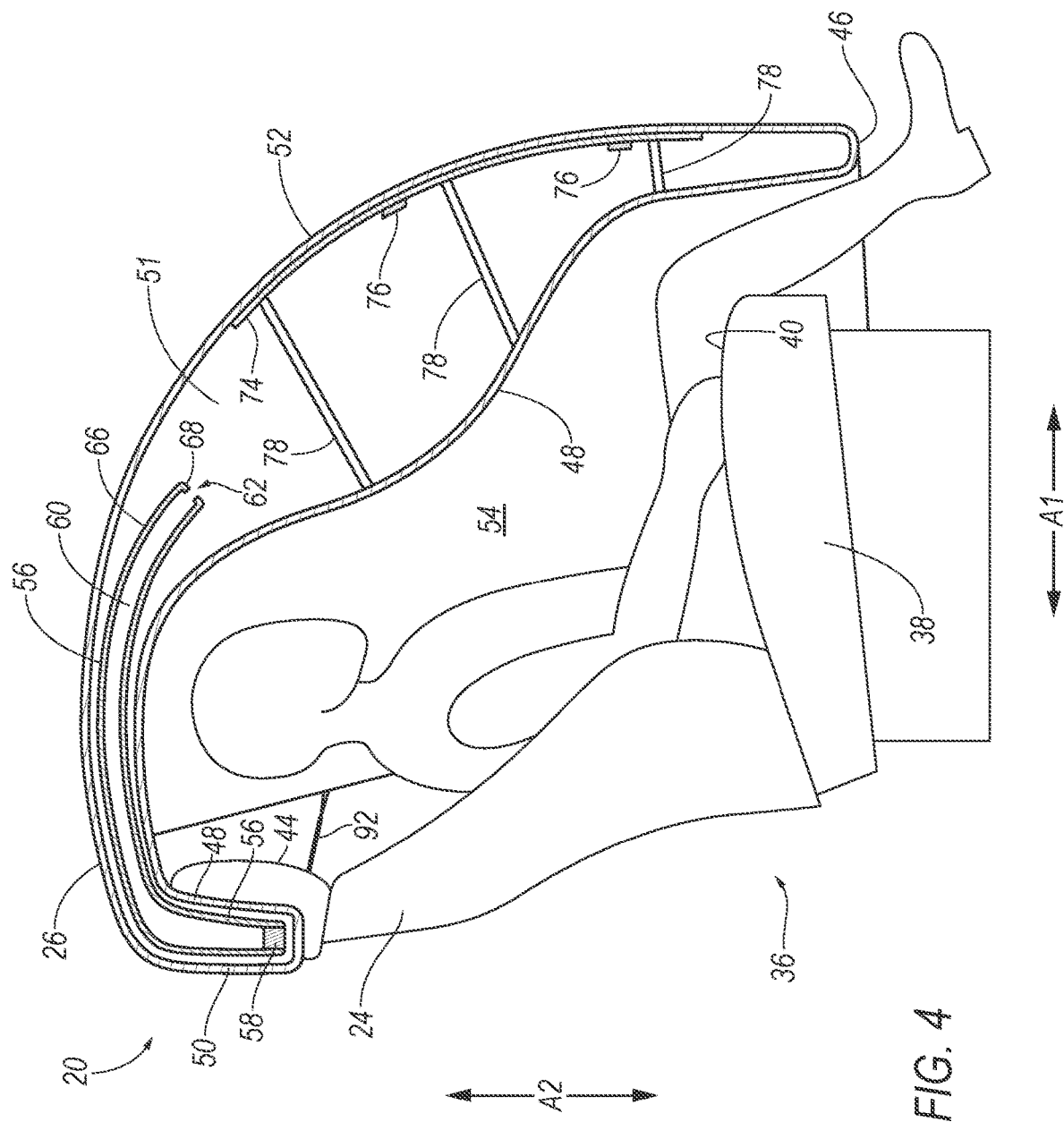
FIG. 4 is a side cross section of the airbag in the inflated position.
Figure 5:
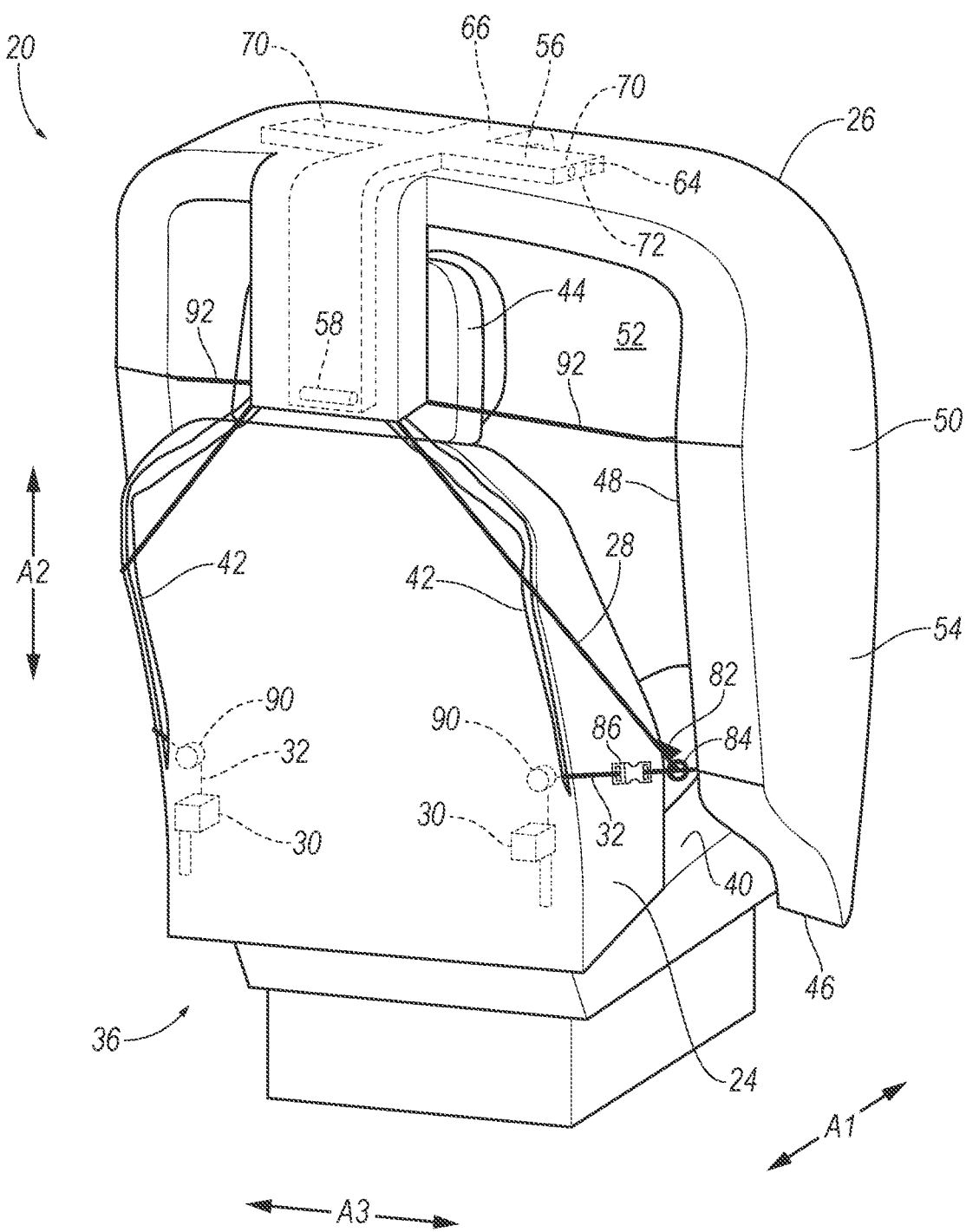
FIG. 5 is a rear perspective view of the seat of the vehicle with the airbag in the inflated position and a second tether at a retracted position.

With reference to FIG. 1, and wherein like reference number indicate like elements throughout the several views, an assembly 20, e.g., for controlling kinematics of an occupant of a vehicle 22, includes a seatback 24 and an airbag 26 supported by the seatback 24. The airbag 26 is inflatable to an inflated position seat-forward of the seatback 24. The assembly 20 includes a first tether 28 fixed to the seatback 24 and the airbag 26. The assembly 20 includes a retractor 30. The assembly 20 includes a second tether 32 connected to and slidable along the first tether 28. The second tether 32 is operatively coupled to the retractor 30. Actuation of the retractor 30 retracts the second tether 32, urging the first tether 28 and the airbag 26 closer to the occupant.

The vehicle 22 may be any suitable type of ground vehicle, e.g., a passenger or commercial automobile such as a sedan, a coupe, a truck, a sport utility, a crossover, a van, a minivan, a taxi, a bus, etc.

The vehicle 22 body defines a passenger compartment 34 to house occupants, if any, of the vehicle 22. The passenger compartment 34 may extend across the vehicle 22, i.e., from one side to the other side of the vehicle 22. The passenger compartment 34 includes a front end and a rear end with the front end being in front of the rear end during forward movement of the vehicle 22.

One or more seats 36 may be supported in the passenger compartment 34. Each seat 36 includes the seatback 24 and a seat bottom 38. The seatback 24 may be supported by the seat bottom 38 and may be stationary or movable relative to the seat bottom 38. The seat bottom 38 may extend seat-forward from the seatback 24 along a longitudinal axis A1. The seat bottom 38 has a top surface 40 than can support an occupant of the seat 36. The seatback 24 and the seat bottom 38 may be adjustable in multiple degrees of freedom. Specifically, the seatback 24 and the seat bottom 38 may themselves be adjustable, in other words, adjustable components within the seatback 24 and/or the seat bottom 38, and/or may be adjustable relative to each other.

The seatback 24 may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback 24 is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The seatback 24 can include tear seams 42, e.g., at right and left sides of the seatback 24. The tear seams 42 may be, for example, a line of decreased material thickness and/or perforations in the covering to induce tearing along the tear seam 42 when subjected to sufficient force, e.g., during inflation of the airbag 26. The tear seam 42 may extend downward from the head restraint 44 and beyond the first tether 28.

Each seat 36 may rotate about a vertical axis A2 that extends through a roof and a floor of the passenger compartment 34. For example, the seat 36 may rotate between a forward-facing position (relative to the vehicle 22), a rearward-facing position, a rightward-facing position, a leftward-facing position, and/or positions therebetween. In the forward-facing position, an occupant of the seat 36 faces the front dash. The seat 36 may rotate completely, i.e., 360°, about the vertical axis A2. The seat 36 may rotate between fixed positions, e.g., the forward-facing position and the rearward-facing position, or may be rotatable to an infinite number of positions.

Each seat 36 may include a head restraint 44. The head restraint 44 controls kinematics of a head of an occupant of the seat 36. The head restraint 44 may be supported by the seatback 24, e.g., at a top of the seatback 24 opposite the seat bottom 38. The head restraint 44 may be stationary or movable relative to the seatback 24.

The airbag 26 controls kinematics of the occupant of the seat 36, e.g., during an impact to the vehicle 22. The airbag 26 is supported by the seatback 24, e.g., fixed to the seatback frame. The airbag 26 may be supported by the head restraint 44 at the top of the seatback 24. The airbag 26 is inflatable from an uninflated position, shown in FIG. 1, to the inflated position, shown in FIGS. 2-5.

The airbag 26 includes one or more fabric panels 48, 50, e.g., a woven polymer. As an example, the airbag 26 may be woven nylon yarn, for example, nylon 6, 6. Other examples of woven polymers include polyether ether ketone (PEEK), polyetherketoneketone (PEKK), polyester, etc. The woven polymer may include a coating, such as silicone, neoprene, urethane, etc. For example, the coating may be polyorgano siloxane. The fabric panels 48, 50 enclose an inflation chamber 51 of the airbag 26.

With reference to FIGS. 2-5, the airbag 26 in the inflated position is seat-forward of the seatback 24, i.e., relative to an orientation of the seat 36. For example, the airbag 26 in the inflated position may extend over top of, and surround, the occupant of the seat 36. The airbag 26 in the inflated position may extend below the top surface 40 of the seat bottom 38, e.g., to control kinematics of legs of the occupant of the seat 36. In other words, a bottom edge 46 of the airbag 26 in the inflated position may be between the top surface 40 of the seat bottom 38 and the floor of the passenger compartment 34. The airbag 26 in the inflated position can include an inner panel 48 and an outer panel 50. The inner panel 48 may be closer to the seatback 24 than the outer panel 50. The inflation chamber 51 may be defined between the inner panel 48 and the outer panel 50. The airbag 26 in the inflated position can include a front portion 52 that is seat-forward of the seatback 24, e.g., with sufficient spacing such that the occupant of the seat 36 may fit between the seatback 24 and the front portion 52. The airbag 26 in the inflated position may include a pair of side portions 54 that control, e.g., movement of the occupant of the seat 36 along a lateral axis A3. The longitudinal axis A1, vertical axis A2 and the lateral axis A3 may be perpendicular to each other. The side portions 54 may extend rearward from the front portion 52 toward the seatback 24, e.g., along the longitudinal axis A1. The side portions 54 may be spaced from each other such that the occupant of the seat 36 may fit between the side portions 54.

The assembly 20 may include a gas deflector 56 within the inflation chamber 51. For example, the gas deflector 56 may be between the inner panel 48 and the outer panel 50 of the airbag 26. The gas deflector 56 directs inflation gas, e.g., from an inflator 58, to various portions of the inflation chamber 51. The gas deflector 56 may include one or more fabric panels that define a passage 60 therebetween. The gas deflector 56 may include first openings 62 that direct inflation gas, e.g., from the passage 60, to the front portion 52. The gas deflector 56 may include second openings 64 that direct inflation gas, e.g., from the passage 60, to the side portions 54. For example, the gas deflector 56 may include a first portion 66 that extends seat-forward from the seatback 24 to a forward distal end 68. The forward distal end 68 may be at the front portion 52. The first openings 62 may be at the forward distal end 68 of the first portion 66. The gas deflector 56 may include a pair of second portions 70 that extend laterally from the first portion 66 to side distal ends 72. The side distal ends 72 may be at the side portions 54. The second openings 64 may be at the side distal ends 72.

The inflator 58 is in fluid communication with the airbag 26, e.g., with the gas deflector 56. The inflator 58 expands the airbag 26 with inflation medium, such as a gas, to move the airbag 26 from the uninflated position to the inflated position. The inflator 58 may be supported by any suitable component. For example, the inflator 58 may be supported by a housing that supports the airbag 26. The inflator 58 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 58 may be, for example, at least partially in the inflation chamber 51, e.g., partially in the gas deflector 56, to deliver inflation medium directly to the inflation chamber 51 or may be connected to the gas deflector 56, through fill tubes, diffusers, etc.

The assembly 20 may include one or more resilient members, e.g., first resilient members 74 and second resilient members 76. The resilient members 74, 76 support and provide shape to the airbag 26 in the inflated position. The resilient members 74, 76 are a elastically deformable material, such as a plastic material that may be deformed, e.g., folded, and packaged with the airbag 26 in the uninflated position and not be deformed, e.g., unfolded, with the airbag 26 in the inflated position. In other words, the elastic material of the first resilient members 74 and the second resilient members 76 may cause the first resilient members 74 and the second resilient members 76 to, upon inflation of the airbag 26, unfold into the elongated shapes show in in the Figures. The resilient members 74, 76 may be fixed to the outer panel 50, e.g., via stitching, adhesive, fastener, etc. The resilient members are stiffer than the outer panel 50. The first resilient members 74 may elongated along the vertical axis A2, e.g., relative to the seat 36. The first resilient members 74 may be spaced from each other along a lateral axis A3 that is perpendicular to the vertical axis A2. The second resilient members 76 may be elongated along the lateral axis A3 and spaced from each other along the vertical axis A2.

The assembly 20 may include internal tethers 78 that provide shape to the airbag 26 in the inflated position. The internal tethers 78 may be fixed to the inner panel 48 and the outer panel 50, e.g., limiting a spacing therebetween and defining a shape of the inflation chamber 51. The internal tether 78 may be fabric or any other suitable material.

The assembly 20 may include a zipper 80 fixed to the airbag 26. The zipper 80 enables the occupant of the seat 36 to egress from the seat 36 subsequent to inflation of the airbag 26. For example, unzipping the zipper 80 may provide an opening though which the occupant may egress. The zipper 80 may be fixed to the inner panel 48 and the outer panel 50. The zipper 80 is elongated along the vertical axis A2. The zipper 80 may extend to the bottom edge 46 of the airbag 26 in the inflated position.

The first tethers 28, e.g., at the right at left sides of the seat 36, control movement of the airbag 26 in the inflated position, e.g., limiting movement of airbag 26 away from the seatback 24. One end of the first tether 28 is fixed to the seatback 24, e.g., to the seatback frame via fastener or other suitable structure. An opposite end of the first tether 28 is fixed to the airbag 26, e.g., via stitching or other suitable structure.

The first tether 28 can include a restrictor 82. The restrictor 82 permits the second tether 32 to slide along the first tether 28 in a first direction and inhibits the second tether 32 from sliding in a second direction opposite the first direction. For example, the restrictor 82 may permit the second pass thereby toward the airbag 26 and inhibit the second tether 32 from passing thereby away from the airbag 26. The restrictor 82 may be wedge shaped, e.g., with a first surface and a second surface that both extend transversely from the first tether 28. The first surface may be shallower, e.g., closer to being parallel to the first tether 28, than the second surface. The second surface may be between the airbag 26 and the first surface. In other words, the restrictor 82 may be a ratchet tooth. The restrictor 82 may be fixed to the first tether 28, e.g., via stitching, fastener, adhesive, or other suitable structure. The restrictor 82 may be plastic or any suitable material.

The second tethers 32, e.g., at the right at left sides of the seat 36, couple the retractor 30 to the first tether 28. One end of the second tether 32 may be connected to and slidable along the first tether 28, e.g., such that the end of the second is permitted to move along the first tether 28 and inhibited from moving away from the first tether 28. For example, the second tether 32 may be fixed to a ring 84, e.g., via a stich or knotted closed loop and/or other suitable structure. The ring 84 may surround the first tether 28, e.g., such that the ring 84 can slide along the first tether 28 and not be removed from the first tether 28. An opposite end of the second tether 32 may be operatively coupled to the retractor 30, i.e., such that actuation of the retractor 30 retracts the second tether 32. For example, the second tether 32 may be fixed to a spool, a rod connected or a piston, or to other suitable structure The second tether 32 can include a releasable buckle 86. The releasable buckle 86 may include male and a female member that are releasably engageable with each other. For example, the occupant may apply force to a prong of resealable buckle to disengage the male and female members from each other. The male and female members may transmit for therebetween when engaged with each other, and be free to move away from each other when disengaged. The releasable buckle 86 enables the occupant of the seat 36 to egress from the seat 36 subsequent to inflation of the airbag 26. For example, disengaging the male and female members from each other may separate the second tether 32 into disconnected parts and permit the occupant to move the airbag 26 away from one side of the seatback 24.

The retractors 30, e.g., at the right at left sides of the seat 36, generate tension in and retract the second tether 32 operatively coupled thereto. The retractor 30 may generate such tension in response to receiving a command from a computer 88. The retractor 30 may be supported by, e.g., fixed to, the seatback 24. For example, the retractor 30 may be fixed to the seatback frame. The retractor 30 may be supported by the seatback 24 below the airbag 26. For example, the retractor 30 may be between the airbag 26 and the floor of the passenger compartment 34. The retractor 30 may include a piston and cylinder arrangement, the piston coupled to the second tether 32. Movement of the piston may generate tension in and retract the second tether 32. The retractor 30 may include a spool around which the second tether 32 is wound. Rotation of the spool may generate tension in and retract the second tether 32. The retractor 30 can include pyrotechnic material. The pyrotechnic may be combustible to produce gas. The pyrotechnic material may be formed of a solid mixture of substances that, when ignited, react to produce the gas. For example, the pyrotechnic material may be formed of sodium azide ($NaNO_3$), potassium nitrate ($KNO_3$), and silicon dioxide ($SiO_2$), which react to form nitrogen gas ($N_2$). Actuation of the pyrotechnic material, e.g., in response to an instruction from the computer 88, may generate gas and urge the piston within the cylinder, apply torque to the spool, etc. The retractor 30 may include any other structure suitable to generate tension in and retract the second tether 32.

The assembly 20 can include pullies 90, e.g., at the right at left sides of the seat 36. The pullies 90 change direction of the second tethers 32. Each pulley 90 may include a rotatable wheel. The wheel may include a groove that surrounds the rotatable wheel. The pulley 90 may be rotatable supported by the seatback 24. For example, the pulley 90 may be connected to the seatback frame via bushing bearing or the like. The pulley 90 may be operatively coupled to the second tether 32 between the first tether 28 and the retractor 30, i.e., such that the pulley 90 directs the second tether 32 extending from the first tether 28 toward the retractor 30. For example, the second tether 32 may be extend at least partially around the wheel of pulley 90 and extend from the pulley 90 to the first tether 28 and from the pulley 90 to the retractor 30. The second tether 32 may be disposed in the groove of the wheel.

The assembly 20 can include third tethers 92, e.g., at the right at left sides of the seat 36. The third tether 92 controls movement of the airbag 26 in the inflated position, e.g., limiting movement of airbag 26 away from the seatback 24. One end of the third tether 92 may fixed to the seatback 24, e.g., to the seatback frame via fastener or other suitable structure. An opposite end of the third tether 92 may fixed to the airbag 26, e.g., via stitching or other suitable structure. The third tether 92 may be fixed to the airbag 26 in the inflated position above the first tether 28. In other words, the first tether 28 at the airbag 26 in the inflated position may be between the floor and the third tether 92 at the airbag 26 in the inflated position.

Figure 6:
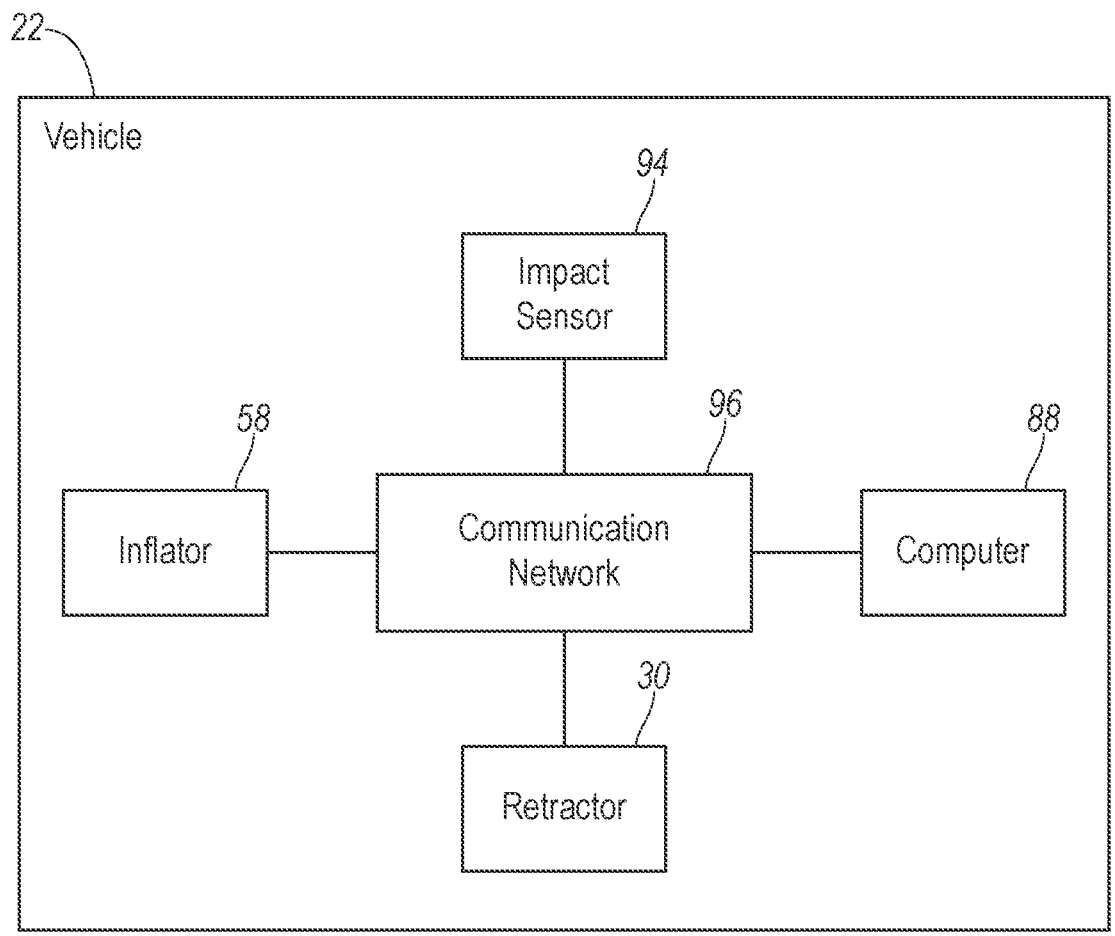
FIG. 6 is a bock diagram of components of the vehicle.

With reference to FIG. 6, the vehicle 22 may include one or more impact sensors 94 configured to detect an impact to the vehicle 22. The impact sensors 94 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors 94 may be located at numerous points in or on the vehicle 22.

The computer 88 is a microprocessor-based controller implemented via circuits, chips, or other electronic components. The computer 88 includes a processor and a memory such as are known. The memory includes one or more forms of computer 88 readable media, and stores instructions executable by the computer 88 for performing various operations, including as disclosed herein. The computer 88 may be programmed to execute operations disclosed herein. Specifically, the memory stores instructions executable by the processor to execute the operations disclosed herein and electronically stores data and/or databases. For example, the computer 88 may include one or more dedicated electronic circuit including an ASIC (Application Specific Integrated Circuit) that is manufactured for a particular operation. In another example, the computer 88 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 88 may be a set of computers communicating with one another.

The computer 88 is generally arranged for communications on a communication network 96 that can include a bus in the vehicle 22 such as a controller area network (CAN) or the like, and/or other wired and/or wireless mechanisms. Via the communication network 96, the computer 88 may transmit messages to various devices in the vehicle 22, and/or receive messages (e.g., CAN messages) from the various devices, e.g., the retractor 30, the inflator 58, the impact sensors 94, etc. Alternatively or additionally, in cases where the computer 88 comprises a plurality of devices, the communication network 96 may be used for communications between devices represented as the computer 88 in this disclosure.

The computer 88 may be programmed to inflate the airbag 26, and to retract the second tether 32. For example, under normal operating conditions of the vehicle 22 airbag 26 is in the uninflated position. In the event of an impact, the impact sensor 94 may detect the impact and transmit a signal through the communication network 96 to the computer 88. In response to receiving such signal, the computer 88 may transmit a signal through the communication network 96 to the inflator 58 to inflate the airbag 26. In response to receiving such signal, the inflator 58 may discharge and inflate the airbag 26 to the inflated position. Also in response to receiving the signal from the impact sensor 94, the computer 88 may command actuation of the retractors 30. The computer 88 may command the retractors 30 a specific amount of time after sending the signal to the inflator 58, e.g., 20 milliseconds. The predetermined amount of time is a sufficient amount of time to permit the airbag 26 to inflated around the occupant and for the second tether 32 to slide past the restrictor 82. Upon receiving such command, the pyrotechnic material of the retractors 30 may detonate and generate tension in the second tethers 32. The tensioned second tethers 32 may draw the airbag 26 snug around legs of the occupant, e.g., via the first tethers 28.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced.

The invention claimed is:

1. An assembly, comprising:
a seatback;
an airbag supported by the seatback and inflatable to an inflated position seat-forward of the seatback;
a first tether fixed to the seatback and the airbag;
a retractor; and
a second tether connected to and slidable along the first tether, the second tether operatively coupled to the retractor.

2. The assembly of claim 1, wherein the seatback includes a head restraint, the airbag supported by the head restraint.

3. The assembly of claim 1, further comprising a ring surrounding the first tether and fixed to the second tether.

4. The assembly of claim 1, wherein the first tether includes a restrictor that permits the second tether to slide along the first tether in a first direction and inhibits the second tether from sliding in a second direction opposite the first direction.

5. The assembly of claim 1, wherein the airbag in the inflated position includes an inner panel and an outer panel that define an inflation chamber.

6. The assembly of claim 5, further comprising a resilient member fixed to the outer panel, the resilient member stiffer than the outer panel.

7. The assembly of claim 6, wherein the resilient member is elongated along a vertical axis.

8. The assembly of claim 6, wherein the resilient member is elongated along a lateral axis.

9. The assembly of claim 5, further comprising a gas deflector within the inflation chamber.

10. The assembly of claim 9, wherein the airbag in the inflated position includes a front portion and a pair of side portions, and wherein the gas deflector includes first openings that direct inflation gas to the front portion and second openings that direct inflation gas to the pair of side portions.

11. The assembly of claim 10, wherein the gas deflector includes a first portion that extends seat-forward from the seatback to the first openings and a pair of second portions that extend laterally from the first portion to the second openings.

12. The assembly of claim 5, further comprising an internal tether fixed to the inner panel and the outer panel.

13. The assembly of claim 1, further comprising a seat bottom supporting the seatback and having a top surface, the airbag in the inflated position extending below the top surface.

14. The assembly of claim 1, further comprising a zipper fixed to the airbag.

15. The assembly of claim 14, wherein the zipper is elongated along a vertical axis and extends to a bottom edge of the airbag in the inflated position.

16. The assembly of claim 1, wherein the retractor is supported by the seatback below the airbag.

17. The assembly of claim 1, wherein the seatback includes a tear seam that extends downward from the first tether.

18. The assembly of claim 1, further comprising a pulley supported by the seatback and operatively coupled to the second tether between the first tether and the retractor.

19. The assembly of claim 1, wherein the second tether includes a releasable buckle.

20. The assembly of claim 1, further comprising a third tether fixed to the seatback and the airbag in the inflated position above the first tether.

* * * * *